Feb. 5, 1952 J. R. GINTER 2,584,385
AERATING MINNOW BUCKET
Filed Feb. 4, 1948
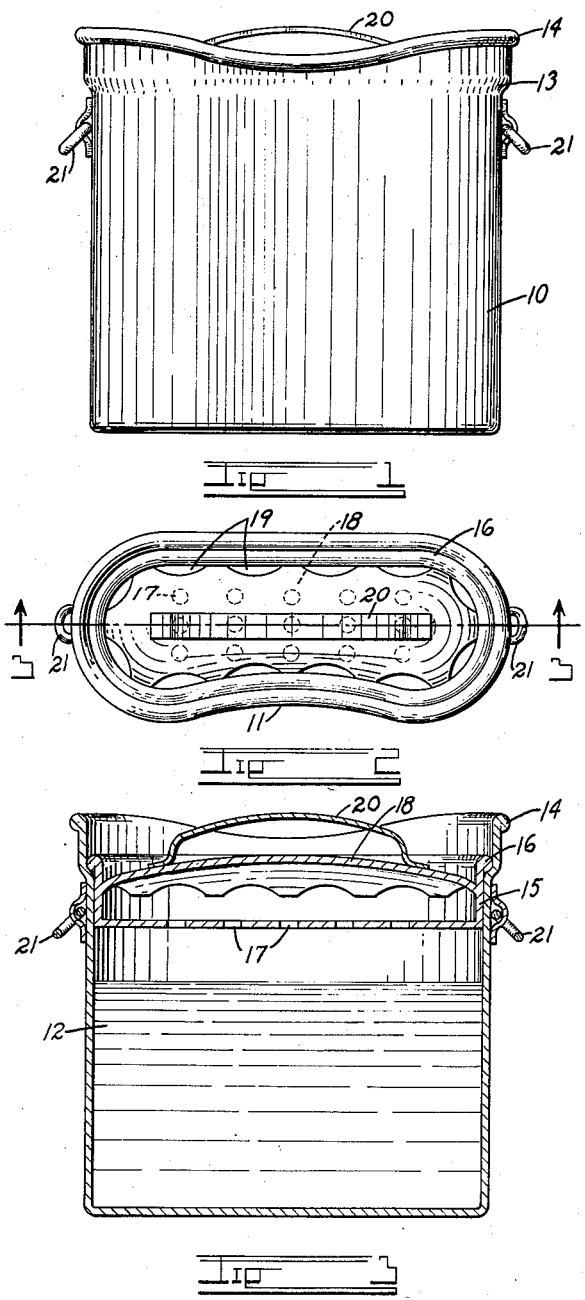
INVENTOR.
JOHN R. GINTER
BY
ATTORNEY Patented Feb. 5, 1952

2,584,385

UNITED STATES PATENT OFFICE 2,584,385

AERATING MINNOW BUCKET

John R. Ginter, Denver, Colo., assignor to
James T. Clark, Fort Morgan, Colo.

Application February 4, 1948, Serial No. 6,172

1 Claim. (Cl. 43—56)

This invention relates to a container for carrying live fishing bait, more particularly live minnows, and has for its principal object the provision of a container which can be conveniently and easily carried on the fisherman's person; which will not injure the minnows; and which will automatically aerate the water in consequence of the movements of the body of the fisherman.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved minnow carrier;

Fig. 2 is a top view thereof; and

Fig. 3 is a vertical, longitudinal section, taken on the line 3—3, Fig. 2.

The improved live bait carrier comprises an outer container 10 having a vertical concavity 11 in one side to enable it to fit snugly to the body of the fisherman. The container is adapted to be partially filled with water, as indicated at 12.

The upper extremity of the container 10 is deformed outwardly to provide a shoulder portion 13, and is preferably formed with a rounded top bead 14 around its upper periphery. A pen-shaped lid 15 is snugly fitted into the upper portion of the container 10.

The lid is provided with a rounded peripheral edge 16 which rests against the shoulder portion 13 of the container. The lid is provided with perforations 17 in its bottom and is formed with a convex top plate 18 permanently secured therein to form an air chamber between the bottom of the lid and the top plate. The peripheral edge of the top plate 18 is indented or cut back at spaced-apart intervals to form a plurality of air openings 19. The top plate 18 carries a handle 20 by means of which the entire lid may be pulled from the container 10.

The upper edge portion of the container 10 is preferably lowered at the sides opposite the handle 20 to facilitate reaching the handle. It is preferably provided with carrying rings 21 by means of which it may be suspended from a suitable shoulder strap or the like.

The minnows or other live bait are placed in the water 12, the lid 15 is forced into place and the device is swung from a shoulder strap or belt on the fisherman's person. The movements of the fisherman in walking and climbing causes the water in the container to splash against the bottom of the lid 15, squirting through the perforations 17 into the air compartment below the top plate 18. The splashes of water will absorb air from this compartment and run back through the perforations to aerate the water 12.

Fresh air is constantly entering the air compartment through the openings 19, and since these openings are not positioned over the perforations 17, the water cannot splash from the container 10. Additional water can be added by simply pouring it onto the top plate 18 and allowing it to run through the passages 19 and the perforations 17.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

An aerating lid for a minnow bucket comprising: a pan-shaped member having upturned sides adapted to slide within the minnow bucket and provided with perforations in its bottom; a projecting peripheral edge on said member limiting its insertion in the bucket; a convex top plate inset within said pan-shaped member within the enclosure of said upturned sides and being secured to the latter above said bottom and below the upper edge of said sides, the peripheral edge of said top plate being notched at spaced-apart intervals to provide air passages around its periphery; and a handle mounted on said convex top plate.

JOHN R. GINTER.

REFERENCES CITED

The following references are of record in the file of this patent:

UNITED STATES PATENTS

| Number | Name | Date |
|---|---|---|
| 347,665 | Vail | Aug. 17, 1886 |
| 372,233 | Northrop | Oct. 25, 1887 |
| 757,645 | Bassett | Apr. 19, 1904 |
| 821,040 | Jones | May 22, 1906 |
| 2,179,095 | Kelsey | Nov. 7, 1939 |
| 2,242,966 | Burkardt | May 20, 1941 |